United States Patent [19]  [11] 3,746,406
Ifield  [45] July 17, 1973

[54] JOURNAL BEARINGS

[75] Inventor: Richard Joseph Ifield, Beecroft, New South Wales, Australia

[73] Assignee: Joseph Lucas (Industries) Limited, Birmingham, England

[22] Filed: July 24, 1970

[21] Appl. No.: 58,058

[30] Foreign Application Priority Data
Aug. 14, 1969  Great Britain............... 40,632/69

[52] U.S. Cl. .................................... 308/36.3
[51] Int. Cl. ................................... F16c 33/74
[58] Field of Search.......... 308/36.1, 36.3, DIG. 1, 308/9; 418/195; 277/165, 237

[56] References Cited
UNITED STATES PATENTS
3,272,572  9/1966  Lloyd ................... 308/36.1
3,449,021  6/1969  Palen .................... 308/36.1
1,307,696  6/1919  Peterson ............... 308/36.1
3,393,917  7/1968  Kendall et al. ........ 277/165
3,387,631  6/1968  Pecis ..................... 251/317
3,280,843  10/1966  Rutherford .......... 251/317
3,048,191  8/1962  Crang .................... 251/317
2,784,013  3/1957  Groen .................... 277/165

OTHER PUBLICATIONS
Huffman, R. E., "Slipper Seals," Pg. 7, Journal of Teflon, May, 1964.

Primary Examiner—Charles J. Myhre
Assistant Examiner—Barry Grossman
Attorney—Holman & Stern

[57] ABSTRACT

A journal bearing for a shaft includes a pair of axially displaced seals between the shaft and its housing, one of the seals lying in a plane inclined to the normal to the shaft axis. A fluid pressure introduced between the seals applies a couple to the shaft which opposes an externally applied couple tending to move the axis of the shaft with respect to the axis of a bore in the housing.

4 Claims, 2 Drawing Figures

PATENTED JUL 17 1973 3,746,406

JOURNAL BEARINGS

BACKGROUND OF THE INVENTION

This invention relates to journal bearings and has as an object to provide such a bearing in an improved form.

SUMMARY OF THE INVENTION

Generally, the invention is directed to the combination of a journal bearing and a shaft which may be subjected, in use, to a couple tending to move the axis of the shaft with respect to the axis of a bore in a body within which the shaft lies, including sealing means between the shaft and the bore, the sealing means being in the form of a ring surrounding the shaft and disposed so that one part of the ring is displaced axially of the shaft with respect to a diametrally opposed part of the ring, a pressure retaining means between the shaft and the body and axially spaced from the sealing means, and means for introducing a fluid under pressure into the space, defined by the body, the shaft, the sealing means and the fluid pressure retaining means.

BRIEF DESCRIPTION OF THE DRAWING

An embodiment of the invention will now be described by way of example and with reference to the accompanying drawings in which.

DETAILED DESCRIPTION OF THE INVENTION

Figure 1:
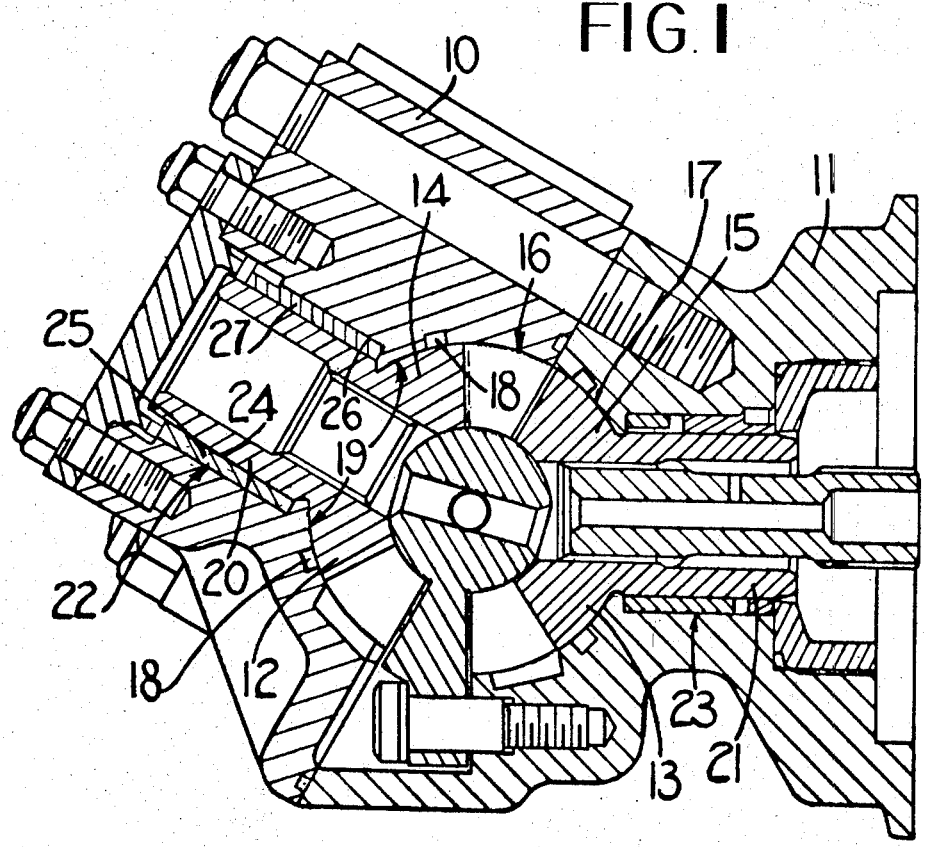
FIG. 1 is a section through a hydraulic pump or motor and FIG. 2 is a detail, to an enlarged scale, of the section of FIG. 1.
Figure 2:
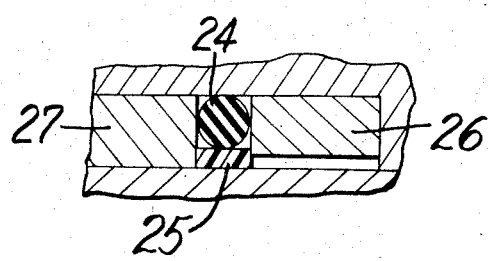

A hydraulic pump or motor incorporates a housing in two parts 10, 11 and a pair of meshed gear elements 12, 13 rotatable within the housing and having their axes mutually inclined. The gear elements 12, 13 comprise shafts having cylindrical portions 20, 21 and part spherical end portions 14, 15 which lie in part spherical recesses 16, 17 in the housing parts 10, 11. The recesses 16, 17 are formed with grooves 18 and lands 19. The shaft portions 20, 21 lie within bearing portions 22, 23 in the housing parts 10, 11.

Surrounding the shaft portion 20, is a ring seal 24 having an elastomeric toroidal portion and which includes a P.T.F.E. tire ring 25 which is urged against shaft portion 20 by the said elastomeric portion. The ring seal 24 is retained in position by bushes 26, 27 in the bearing portion 22. The polar axis of the ring seal 24 is inclined to the axis of the shaft portion 20, the form of the seal 24 in its own plane thus being an ellipse. The shaft portion 21 of the gear element 13 is provided with a similar seal.

In use the gear element 12, 13 are subjected to hydraulic pressures which are highest adjacent those areas where elements 12, 13 are in mesh. These pressures result in a force urging the portion 14 of element 12 towards the lands 19 of the housing part 10, and also results in a couple tending to rotate the element 12 about the common center of the recesses 16, 17 in an anticlockwise direction as seen in the drawing. Fluid under pressure is supplied to the part of the bearing portion 22 in which the bush 26 lies, and a proportion of this fluid passes between the portion 14 and the lands 19, which thus cooperate to form a hydrostatic bearing and to retain the pressure at the aforesaid part of the bearing portion 22. The force applied by the fluid pressure to one part of the shaft portion 20 is thus substantially greater than the force so applied at a diametrally opposed part of the shaft portion 20. The ring seal 24 is so orientated that its distance from portion 14 is greatest at a location generally diametrally opposed to the area of maximum hydraulic pressure on element 12. The resultant radial force on the shaft portion 20 opposes the couple applied by pressures on the gear element 12. The couple on the gear element 13 is similarly opposed.

Having thus described my invention what I claim as new and desire to secure by Letters Patent is:

1. The combination of a journal bearing and a shaft which may be subjected, in use, to a couple tending to move the axis of the shaft with respect to the axis of a bore in a body within which the shaft lies, including sealing means between the shaft and the bore, the sealing means being in the form of a ring surrounding the shaft and disposed so that one part of the ring is displaced axially of the shaft with respect to a diametrally opposed part of the ring, a pair of axially spaced bushes for surrounding the shaft and defining a recess within which the ring lies, fluid pressure retaining means between the shaft and the body and axially spaced from the sealing means, and means for introducing a fluid under pressure into the space defined by the body, the shaft, the sealing means and the fluid pressure retaining means.

2. The combination as claimed in claim 1 in which the ring includes a portion having a low co-efficient of friction, the portion engaging the shaft.

3. The combination as claimed in claim 1 in which the recess lies in a single plane inclined to the shaft axis.

4. The combination as claimed in claim 1 in which the fluid pressure retaining means forms, in use, a hydrostatic bearing between the shaft and the body.

* * * * *